March 24, 1953 P. D. PARKS 2,632,570
COSTUMER DEVICE AND THE MANUFACTURE THEREOF
Filed Aug. 12, 1950 2 SHEETS—SHEET 1

INVENTOR.
PAUL D. PARKS
BY *Fred Bing*
ATTORNEY

March 24, 1953  P. D. PARKS  2,632,570
COSTUMER DEVICE AND THE MANUFACTURE THEREOF
Filed Aug. 12, 1950  2 SHEETS—SHEET 2

INVENTOR.
PAUL D. PARKS
BY Fred Bing
ATTORNEY

Patented Mar. 24, 1953

2,632,570

UNITED STATES PATENT OFFICE 2,632,570

COSTUMER DEVICE AND THE MANUFACTURE THEREOF

Paul D. Parks, Winona Lake, Ind.

Application August 12, 1950, Serial No. 179,010

4 Claims. (Cl. 211—87)

This invention relates to costumer devices of a type comprising a plurality of hook members in position for supporting a number of hats or other garments, and to an improved process of manufacturing such devices. It is the object of my invention to improve devices of this type with respect to their form for convenient use and also with respect to ease and low cost of manufacture. It is particularly one of the objects of my invention to provide an improved process of manufacture by which the parts used may be prepared on a mass production basis and may be assembled quickly and cheaply into a form which shall have great strength and durability, without danger of requiring repair frequently, and in which the members by which the hooks are carried shall be rotatable about a vertical axis. For attaining this object, I have made the parts of my improved device largely in the form of sheet metal stampings and shaped metal bar parts adapted to be connected together in their operative form by a limited number of welding, brazing or like operations which are capable of being performed rapidly and easily.

It is another object of my invention to improve devices of this type and the methods of forming them in sundry details, hereinafter pointed out.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

Figure 1:
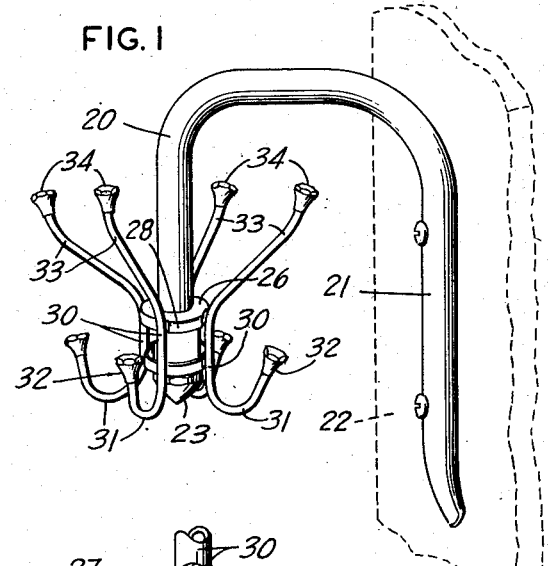
Fig. 1 is a perspective view of a preferred form of my improved device.
Figure 2:
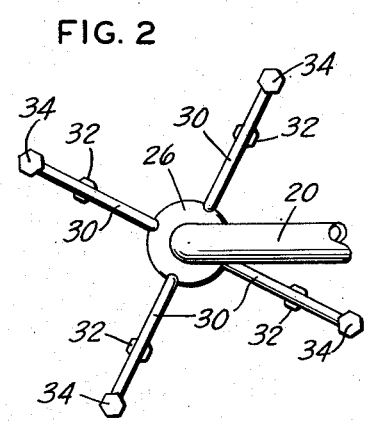
Fig. 2 is a type plan view of the parts shown in Fig. 1, but with portions broken away.
Figure 3:
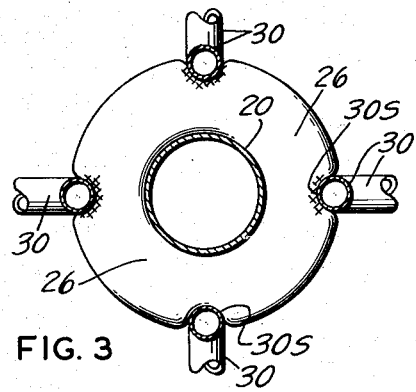
Figure 4:
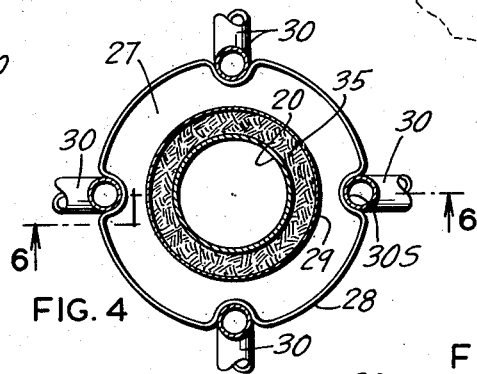
Figure 5:
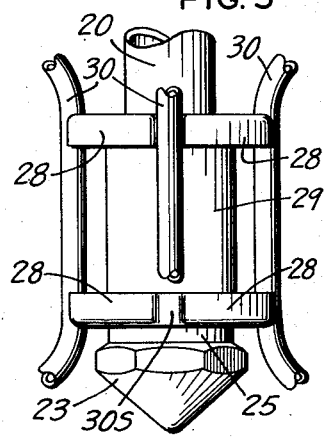
Figure 7:
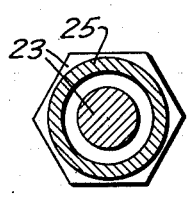
Figure 6:
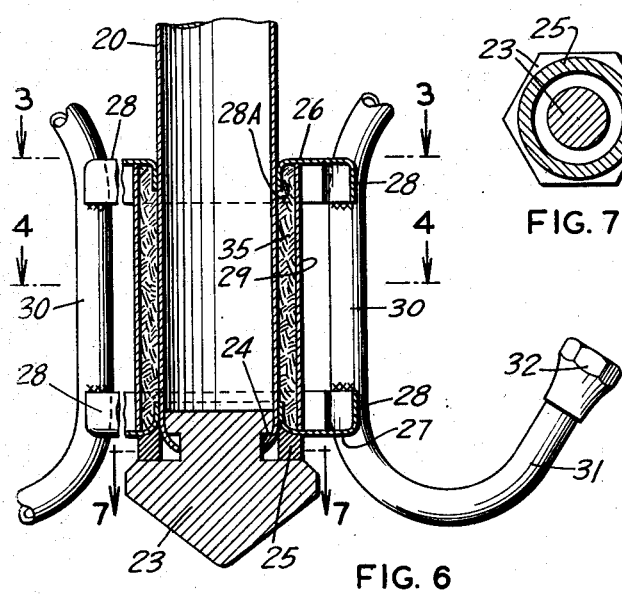
Figure 8:
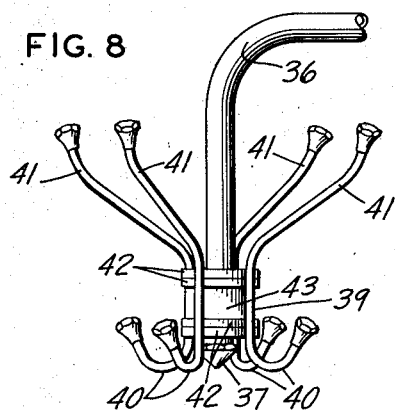
Figure 9:
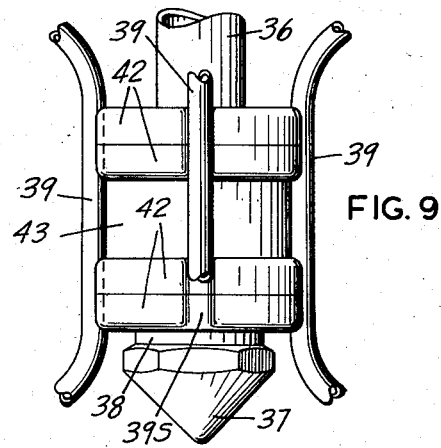
Figure 11:
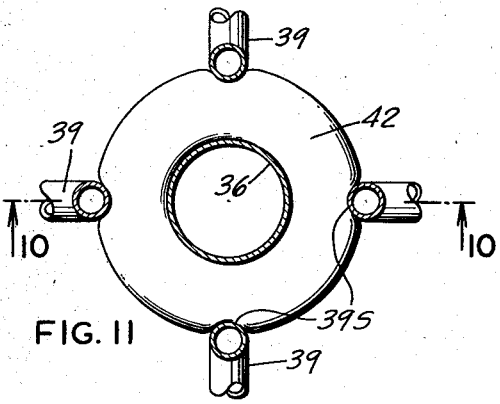
Figure 12:
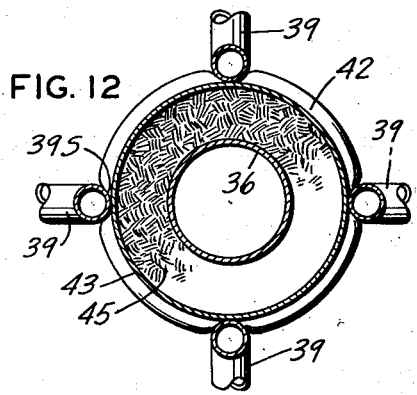
Figure 10:
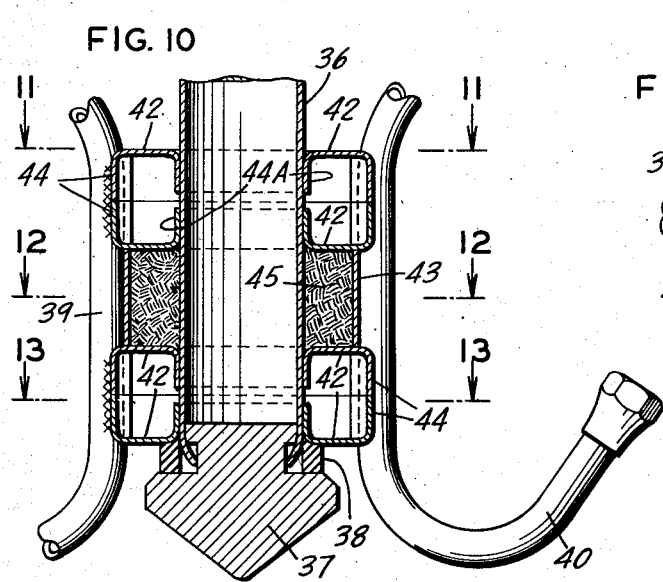
Figure 13:
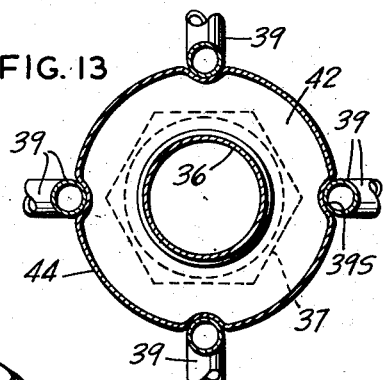

Figs. 3 and 4 are horizontal sectional views taken substantially at the line 3—3 and the line 4—4, respectively, in Fig. 6;

Fig. 5 is a side view of a portion of my improved device shown on a substantially enlarged scale;

Fig. 6 is a central vertical sectional view taken on an enlarged scale at line 6—6 in Fig. 4;

Fig. 7 is a horizontal sectional view taken substantially at the line 7—7 in Fig. 6;

Fig. 8 is a view similar to Fig. 1 but showing a modification form of my device;

Fig. 9 is a side view of a portion of the device as shown in Fig. 8;

Fig. 10 is a central vertical sectional view taken substantially at the line 10—10 in Fig. 11; and Figs. 11, 12, and 13 are horizontal sectional views taken substantially at the line 11—11, the line 12—12, and the line 13—13, respectively, in Fig. 10.

Referring now particularly to Figs. 1 to 7 of the drawings in which corresponding parts are indicated by the same reference characters, 20 indicates a downwardly extending bar formed from a piece of metal tubing which, in the form illustrated, is bent into shape as shown in Fig. 1 to provide an arm 21 secured to a vertical support 22. At the lower end of the tubular bar 20, a supporting member 23 is secured fixedly in position by inwardly pressed lower end portion of the tubing extending into an annular groove 24 in said supporting member, as is clearly shown in Fig. 6. A lubricant-containing bearing such as a commercially available Oilite bearing 25, in the form of a sleeve tapered at its upper end, is supported by the supporting member 23 about the lower end of the bar 20.

Above the bearing 25, I have provided a head rotatably mounted in position on the bar 20, comprising two rings 26 and 27, each stamped from sheet metal and having flanges 28 and 28A at its outer and inner edges, respectively, in substantially cylindrical form, said two rings being held in spaced relationship to each other by an interposed metal sleeve member 29. Said rings 26 and 27 are secured in rigid position with respect to each other and in tight engagement with the ends of the sleeve 29 by a plurality of metal hook members 30 secured by resistance welding, or by other methods of welding or brazing, in vertically aligned seats 30S formed in the outer faces of the outer cylindrical flanges 28 of said rings. Each of said hook members 30 is formed from a length of metal bar stock, rod stock, hollow rod stock or tubing bent into shape to provide a hook portion 31 at its lower end, having a cap 32 mounted thereon, and an upwardly and outwardly extending arm portion 33, having a cap 34 mounted thereon. The term "rod" will be used herein to denote any one of the materials that may thus be used for the hook members. Inside of the sleeve 29, I have provided a quantity of absorbent material 35 which may be in the form of a pile fabric adapted to receive a supply of a lubricant of any approved type in position to be effective for lubricating the opposed surfaces of the bar 20 and the rotatable head structure.

As a result of the use of my improved construction as above described, I am enabled to fabricate the head structure very easily and expeditiously. With a supply of rings 26 and 27 available, stamped from sheet metal, and a supply of hook members 30 bent into shape from metal rods, two of the rings are placed in centered position with respect to each other at opposite ends of one of the sleeves 29 and pressed forcibly toward each other, after which four of the hook members 30 are disposed in the pairs of aligned seats 30S and are secured quickly and easily in position by resistance or similar welding or brazing operations to said rings 26 and 27, serving to hold all of the parts rigidly in their operative positions.

In the arrangement shown in Figs. 8 to 13, a downwardly extending supporting bar 36 is provided, having a supporting member 37 secured thereon, with an Oilite bearing sleeve 38 mounted on said supporting member. Hook members 39 are secured in vertical position by means of a head structure, as hereinafter described, each of said hook members 39 being formed from metal rods and comprising a hook portion 40 at its lower end, and an upwardly and outwardly extending arm portion 41 at its upper end.

As is clearly shown in Fig. 10, the head by which the hook members 39 are supported comprises four sheet metal rings 42 arranged in pairs, with a sleeve 43 interposed between the rings of one pair and the rings of the other pair. As is clearly shown in said Fig. 10, each of the rings 42 is provided with flanges 44 and 44A at its outer and inner edges, respectively, in substantially cylindrical form, the rings of each pair being reversely positioned with respect to each other, with the outer cylindrical flanges of the rings of each pair held in engagement with each other by the hook members 39 welded or brazed in position in seats 39S formed in the outer faces of said outer cylindrical flanges. Within the sleeve 43 between the inside rings 42, I have provided a quantity of absorbent material 45 for holding a suitable supply of lubricant in operative position for facilitating rotation of the head on the supporting bar 36 and the bearing 38. For fabricating the form of head as shown in Figs. 8 to 13, four of the rings 32 are placed in centered position with respect to each other, with the inside rings pressed into engagement with the ends of an interposed sleeve 43. The four hook members 39 are then welded or brazed in position to all four of the rings 42, serving to hold all of the head parts strongly in position, as illustrated.

In the absence of a recognized generic term to denote the welding, brazing or like operations by which the hook members are secured to the rings, I will hereinafter employ the phrase "metal bonding" or variants thereof to define these operations and the joints produced thereby.

By use of my improved construction and arrangement, a highly effective costumer device is provided that is adapted for convenient use, and in which the selected hook member may be turned readily in position for access, such device being of great strength and durability for long, continued use. The arrangement is such that my improved device can be very easily and cheaply produced with practically no machine work necessary beyond that required for the mass production of the parts by stamping and shaping operations.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A costumer device comprising, in combination, a vertically disposed supporting shaft, a head comprising cylindrically flanged rings arranged in pairs, an interposed sleeve concentric with and separating the rings of one pair from the rings of the other pair, and hook members formed from lengths of metal bar and disposed about said pairs of rings and metal bonded to such rings to hold said rings, said sleeve and said hook members rigidly in position with respect to each other, said head being rotatably mounted on said supporting shaft, and means on said shaft for supporting said head at a predetermined level thereon.

2. A costumer device comprising, in combination, a head comprising at least two rings formed with inner and outer cylindrical flanges and disposed in axially aligned but spaced relation, a spacing sleeve of a diameter greater than the diameter of said inner flanges and disposed between and in coaxial relation with respect to said rings, a plurality of hook members formed from metal bars and having portions extending parallel to the axis of said rings and engaging and metal bonded to the outer flanges of the spaced rings to hold said rings, said sleeve and said hook members together as a unitary head, lubricant-bearing packing material disposed within said spacing sleeve, a supporting cylindrical member extended through said head in bearing relation to said inner flanges of said rings, and means on said supporting cylindrical member for supporting said head in predetermined axial position on said supporting cylindrical member.

3. A costumer device comprising, in combination, a head comprising at least two rings formed with inner and outer cylindrical flanges and disposed in axially aligned but spaced relation, a spacing sleeve of a diameter greater than the diameter of said inner flanges and disposed between and in coaxial relation with respect to said rings, a plurality of hook members formed from metal bars and having portions extending parallel to the axis of said rings and engaging and metal bonded to the outer flanges of the spaced rings to hold said rings, said sleeve and said hook members together as a unitary head, a supporting cylindrical member extended through said head in bearing relation to said inner flanges of said rings, and means including a thrust bearing on said supporting cylindrical member for supporting said head in predetermined axial position on said supporting cylindrical member.

4. In a costumer device, a head comprising at least two rings formed with inner and outer cylindrical flanges and disposed in axially aligned but spaced relation, a spacing sleeve of a diameter greater than the diameter of said inner flanges and disposed between and in coaxial relation with respect to said rings, and a plurality of hook members formed from metal bars and having portions extending parallel to the axis of said rings and engaging and metal bonded to the outer flanges of the spaced rings to hold said rings, said sleeve and said hook members together as a unitary head.

PAUL D. PARKS.

REFERENCES CITED

The following references are of record in the file of this patent:

UNITED STATES PATENTS

| Number | Name | Date |
|---|---|---|
| D. 160,421 | Parks | Oct. 10, 1950 |
| 927,082 | Smalley | July 6, 1909 |
| 976,205 | Neuhaus | Nov. 22, 1910 |
| 1,387,765 | Colonna | Aug. 16, 1921 |
| 1,711,587 | Brunhoff | May 7, 1929 |
| 1,804,837 | Lunn | May 12, 1931 |
| 1,973,183 | Tarbox | Sept. 11, 1934 |
| 2,253,286 | Cronan | Aug. 19, 1941 |